(12) United States Patent
Heymel et al.

(10) Patent No.: US 12,134,229 B2
(45) Date of Patent: Nov. 5, 2024

(54) METHOD AND APPARATUS FOR PRODUCING 3D MOLDINGS BY MEANS OF A LAYERING TECHNIQUE, AND RECOATER WITH VACUUM CLOSURE

(71) Applicant: Voxeljet AG, Friedberg (DE)

(72) Inventors: Bastian Heymel, Augsburg (DE); Martin Sinzinger, Augsburg (DE); Tobias Lachenmair, Augsburg (DE)

(73) Assignee: VOXELJET AG, Friedberg (DE)

( * ) Notice: Subject to any disclaimer, the term of this patent is extended or adjusted under 35 U.S.C. 154(b) by 25 days.

(21) Appl. No.: 17/618,320

(22) PCT Filed: Jun. 11, 2020

(86) PCT No.: PCT/DE2020/000128
§ 371 (c)(1),
(2) Date: Dec. 10, 2021

(87) PCT Pub. No.: WO2020/249151
PCT Pub. Date: Dec. 17, 2020

(65) Prior Publication Data
US 2022/0363000 A1     Nov. 17, 2022

(30) Foreign Application Priority Data
Jun. 14, 2019   (DE) .................. 10 2019 004 176.3

(51) Int. Cl.
| | | |
|---|---|---|
| *B29C 64/165* | (2017.01) | |
| *B22F 10/10* | (2021.01) | |
| *B22F 10/20* | (2021.01) | |
| *B22F 12/52* | (2021.01) | |
| *B22F 12/67* | (2021.01) | |

(Continued)

(52) U.S. Cl.
CPC ............ *B29C 64/165* (2017.08); *B22F 10/10* (2021.01); *B22F 10/20* (2021.01); *B22F 12/52* (2021.01); *B22F 12/67* (2021.01); *B28B 1/001* (2013.01); *B29C 64/214* (2017.08); *B29C 64/255* (2017.08); *B29C 64/329* (2017.08); *B29C 64/35* (2017.08); *B29C 64/371* (2017.08);

(Continued)

(58) Field of Classification Search
CPC ............................ B29C 64/214; B29C 64/255
See application file for complete search history.

(56) References Cited

U.S. PATENT DOCUMENTS

| | | |
|---|---|---|
| 4,247,508 A | 1/1981 | Housholder |
| 4,575,330 A | 3/1986 | Hull |

(Continued)

FOREIGN PATENT DOCUMENTS

| | | |
|---|---|---|
| AU | 720255 B2 | 5/2000 |
| CN | 101146666 A | 3/2008 |

(Continued)

OTHER PUBLICATIONS

US 4,937,420 A, 06/1990, Deckard (withdrawn)

(Continued)

*Primary Examiner* — Timothy Kennedy
(74) *Attorney, Agent, or Firm* — The Dobrusin Law Firm, P.C.

(57) ABSTRACT

The invention relates to a method and an apparatus for producing three-dimensional models by layering technology, and a recoater with a vacuum closure.

22 Claims, 9 Drawing Sheets

(51) Int. Cl.

| | |
|---|---|
| *B28B 1/00* | (2006.01) |
| *B29C 64/214* | (2017.01) |
| *B29C 64/255* | (2017.01) |
| *B29C 64/329* | (2017.01) |
| *B29C 64/35* | (2017.01) |
| *B29C 64/371* | (2017.01) |
| *B33Y 10/00* | (2015.01) |
| *B33Y 30/00* | (2015.01) |
| *B33Y 40/00* | (2020.01) |

(52) U.S. Cl.
CPC .............. *B33Y 10/00* (2014.12); *B33Y 30/00* (2014.12); *B33Y 40/00* (2014.12)

(56) References Cited

U.S. PATENT DOCUMENTS

| | | |
|---|---|---|
| 4,665,492 A | 5/1987 | Masters |
| 4,752,352 A | 6/1988 | Feygin |
| 4,752,498 A | 6/1988 | Fudim |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,059,266 A | 10/1991 | Yamane et al. |
| 5,120,476 A | 6/1992 | Scholz |
| 5,126,529 A | 6/1992 | Weiss et al. |
| 5,127,037 A | 6/1992 | Bynum |
| 5,134,569 A | 7/1992 | Masters |
| 5,136,515 A | 8/1992 | Helinski |
| 5,149,548 A | 9/1992 | Yamane et al. |
| 5,155,324 A | 10/1992 | Deckard et al. |
| 5,156,697 A | 10/1992 | Bourell et al. |
| 5,248,456 A | 8/1993 | Evans, Jr. et al. |
| 5,252,264 A | 10/1993 | Forderhase et al. |
| 5,284,695 A | 2/1994 | Barlow et al. |
| 5,342,919 A | 8/1994 | Dickens, Jr. et al. |
| 5,352,405 A | 10/1994 | Beaman et al. |
| 5,387,380 A | 2/1995 | Cima et al. |
| 5,398,193 A | 3/1995 | deAngelis |
| 5,503,785 A | 4/1996 | Crump et al. |
| 5,518,060 A | 5/1996 | Cleary et al. |
| 5,518,680 A | 5/1996 | Cima et al. |
| 5,555,176 A | 9/1996 | Menhennett et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,749,041 A | 5/1998 | Lakshminarayan et al. |
| 5,753,274 A | 5/1998 | Wilkening et al. |
| 5,824,250 A | 10/1998 | Whalen |
| 5,851,465 A | 12/1998 | Bredt |
| 5,884,688 A | 3/1999 | Hinton et al. |
| 5,902,537 A | 5/1999 | Almquist et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 6,048,188 A | 4/2000 | Hull et al. |
| 6,048,954 A | 4/2000 | Barlow et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,193,922 B1 | 2/2001 | Ederer |
| 6,210,625 B1 | 4/2001 | Matsushita |
| 6,217,816 B1 | 4/2001 | Tang |
| 6,243,616 B1 | 6/2001 | Droscher et al. |
| 6,259,962 B1 | 7/2001 | Gothait |
| 6,270,335 B2 | 8/2001 | Leyden et al. |
| 6,305,769 B1 | 10/2001 | Thayer et al. |
| 6,335,097 B1 | 1/2002 | Otsuka et al. |
| 6,375,874 B1 | 4/2002 | Russell et al. |
| 6,403,002 B1 | 6/2002 | Van Der Geest |
| 6,405,095 B1 | 6/2002 | Jang et al. |
| 6,423,255 B1 | 7/2002 | Hoechsmann et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,827,988 B2 | 12/2004 | Krause et al. |
| 6,830,643 B1 | 12/2004 | Hayes |
| 6,838,035 B1 | 1/2005 | Ederer et al. |
| 6,896,839 B2 | 5/2005 | Kubo et al. |
| 7,120,512 B2 | 10/2006 | Kramer et al. |
| 7,153,463 B2 | 12/2006 | Leuterer et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,455,805 B2 | 11/2008 | Oriakhi et al. |
| 7,497,977 B2 | 3/2009 | Nielsen et al. |
| 7,597,835 B2 | 10/2009 | Marsac |
| 7,641,461 B2 | 1/2010 | Khoshnevis |
| 7,790,096 B2 | 9/2010 | Merot et al. |
| 7,799,253 B2 | 9/2010 | Höschmann et al. |
| 8,186,415 B2 | 5/2012 | Marutani et al. |
| 8,574,485 B2 | 11/2013 | Kramer |
| 8,951,033 B2 | 2/2015 | Höchsmann et al. |
| 9,327,450 B2 | 5/2016 | Hein et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0083771 A1 | 5/2003 | Schmidt |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0094058 A1 | 5/2004 | Kasperchik et al. |
| 2004/0112523 A1 | 6/2004 | Crom |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0079086 A1 | 4/2005 | Farr |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0276976 A1 | 12/2005 | Pfeifer et al. |
| 2005/0280185 A1 | 12/2005 | Russell et al. |

(56) References Cited

U.S. PATENT DOCUMENTS

| | | |
|---|---|---|
| 2006/0012058 A1 | 1/2006 | Hasei |
| 2006/0103054 A1 | 5/2006 | Pfeifer et al. |
| 2006/0105102 A1 | 5/2006 | Hochsmann et al. |
| 2006/0159896 A1 | 7/2006 | Pfeifer et al. |
| 2006/0175346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0057412 A1 | 3/2007 | Weiskopf et al. |
| 2007/0126157 A1 | 6/2007 | Bredt |
| 2007/0238056 A1 | 10/2007 | Baumann et al. |
| 2007/0241482 A1 | 10/2007 | Giller et al. |
| 2008/0001331 A1 | 1/2008 | Ederer |
| 2008/0003390 A1 | 1/2008 | Hayashi |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0068376 A1 | 3/2009 | Philippi et al. |
| 2010/0007048 A1 | 1/2010 | Schweininger |
| 2010/0007062 A1 | 1/2010 | Larsson et al. |
| 2010/0207288 A1 | 8/2010 | Dini |
| 2010/0212584 A1 | 8/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kahani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2012/0046779 A1 | 2/2012 | Pax et al. |
| 2012/0097258 A1 | 4/2012 | Harmann et al. |
| 2012/0113439 A1 | 5/2012 | Ederer et al. |
| 2012/0126457 A1 | 5/2012 | Abe et al. |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0052291 A1 | 2/2013 | Morikawa |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2014/0048980 A1 | 2/2014 | Crump et al. |
| 2014/0065194 A1 | 3/2014 | Yoo |
| 2014/0212677 A1 | 7/2014 | Gnuchtel et al. |
| 2014/0227123 A1 | 8/2014 | Gunster |
| 2014/0271961 A1 | 9/2014 | Khoshnevis |
| 2014/0306379 A1 | 10/2014 | Hartmann et al. |
| 2015/0042018 A1 | 2/2015 | Gunther et al. |
| 2015/0110910 A1 | 4/2015 | Hartmann et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1* | 12/2015 | Hartmann ............... B28B 1/001 425/130 |
| 2015/0375419 A1 | 12/2015 | Gunther et al. |
| 2016/0236422 A1 | 8/2016 | Sakura |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2016/0318251 A1 | 11/2016 | Ederer et al. |
| 2017/0050378 A1 | 2/2017 | Ederer |
| 2017/0106595 A1 | 4/2017 | Gunther et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0210037 A1 | 7/2017 | Ederer et al. |
| 2017/0297263 A1 | 10/2017 | Ederer et al. |
| 2017/0305139 A1 | 10/2017 | Hartmann |
| 2017/0355137 A1 | 12/2017 | Ederer et al. |
| 2018/0079133 A1 | 3/2018 | Ederer et al. |
| 2018/0141271 A1 | 5/2018 | Gunter et al. |
| 2018/0193887 A1 | 7/2018 | Poucher et al. |
| 2018/0200791 A1* | 7/2018 | Redding ............... B29C 64/153 |
| 2018/0243883 A1 | 8/2018 | Brandl |
| 2018/0297284 A1 | 10/2018 | Fulop et al. |
| 2018/0326662 A1 | 11/2018 | Gunther et al. |
| 2018/0339452 A1* | 11/2018 | Heymel ............... B29C 64/241 |
| 2018/0369910 A1 | 12/2018 | Gunter et al. |
| 2019/0047218 A1 | 2/2019 | Ederer et al. |
| 2019/0084229 A1 | 3/2019 | Gunther |
| 2019/0126555 A1 | 5/2019 | Lebed |
| 2020/0055246 A1 | 2/2020 | Gunther et al. |
| 2020/0130263 A1 | 4/2020 | Gunther et al. |
| 2020/0189259 A1 | 6/2020 | Hartmann et al. |
| 2020/0254691 A1* | 8/2020 | Mamrak ............... B29C 64/153 |
| 2020/0262141 A1 | 8/2020 | Ederer et al. |
| 2021/0316507 A1 | 10/2021 | Grasegger et al. |
| 2022/0258412 A1 | 8/2022 | Scheck et al. |
| 2022/0288849 A1 | 9/2022 | Ederer et al. |
| 2022/0363000 A1 | 11/2022 | Heymel et al. |
| 2022/0371267 A1 | 11/2022 | Gnuchtel et al. |
| 2022/0379553 A1 | 12/2022 | Hoppman et al. |
| 2022/0388247 A1 | 12/2022 | Heymel et al. |
| 2022/0402203 A1 | 12/2022 | Scheck et al. |
| 2022/0402209 A1 | 12/2022 | Heymel et al. |

FOREIGN PATENT DOCUMENTS

| | | |
|---|---|---|
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4 325 573 A1 | 2/1995 |
| DE | 29506204 U1 | 6/1995 |
| DE | 4440397 | 9/1995 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 102006040305 A1 | 3/2007 |
| DE | 102006029298 A1 | 12/2007 |
| DE | 102007040755 A1 | 3/2009 |
| DE | 102007047326 A1 | 4/2009 |
| DE | 102011053205 A1 | 3/2013 |
| DE | 202016003042 U1 | 7/2016 |
| DE | 102017200773 A1 | 7/2018 |
| EP | 0361847 B1 | 4/1990 |
| EP | 0431924 A2 | 12/1991 |
| EP | 1415792 | 5/2004 |
| EP | 1457590 A | 9/2004 |
| EP | 2202016 A1 | 6/2010 |
| EP | 3202534 A1 | 8/2017 |
| GB | 2297516 A | 8/1996 |
| GB | 2575544 A | 1/2020 |
| JP | S62275734 A | 11/1987 |
| JP | 2003/136605 A | 5/2003 |
| JP | 2004/082206 A | 3/2004 |
| JP | 2009/202451 A | 9/2009 |
| WO | 90/03893 A1 | 4/1990 |
| WO | 01/40866 A2 | 6/2001 |
| WO | 2004/014637 A1 | 2/2004 |
| WO | 2006/100166 A1 | 9/2006 |
| WO | 2008/049384 A1 | 5/2008 |
| WO | 2008/061520 A2 | 5/2008 |
| WO | 2011/063786 A1 | 6/2011 |
| WO | 2013/075696 A1 | 5/2013 |

(56) References Cited

FOREIGN PATENT DOCUMENTS

| WO | 2014/090207 A1 | 6/2014 |
| WO | 2014/166469 A1 | 10/2014 |
| WO | 2016/019942 A1 | 2/2016 |
| WO | 2017/008777 A1 | 1/2017 |
| WO | 2019/027404 A1 | 2/2019 |

OTHER PUBLICATIONS

Cima et al., "Computer-derived Microstructures by 3D Printing: Bio- and Structural Materials," SFF Symposium, Austin, TX, 1994.

Feature Article—Rapid Tooling—Cast Resin and Sprayed Metal Tooling by Joel Segal, Apr. 2000.

International Search Report and Written Opinion, PCT Application No. PCT/DE2020/000128, dated Oct. 2, 2020.

International Preliminary Report on Patentability, PCT Application No. PCT/DE2020/000128, dated Dec. 14, 2021.

Jacobs et al., 2005 SME Technical Paper, title "Are QuickCast Patterns Suitable for Limited Production?".

Marcus et al., Solid Freedom Fabrication Proceedings, Nov. 1993.

Marcus, et al., Solid Freeform Fabrication Proceedings, Sep. 1995, pp. 130-133.

Sachs et al., "Three-Dimensional Printing: Rapid Tooling and Prototypes Directly from a CAD Model", Massachusetts Institute of Technology, pp. 143-151, Jan. 1990.

Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.

Screen shots of URL: http://www.youtube.com/watch?v=hgIrNXZjIxU taken in approximately 5 second intervals on Nov. 12, 2015.

Williams, "Feasibility Study of Investment Casting Pattern Design by Means of Three Dimensional Printing", Department of Mechanical Engineering, abstract only; Sep. 25, 2001.

* cited by examiner

Fig. 1.1
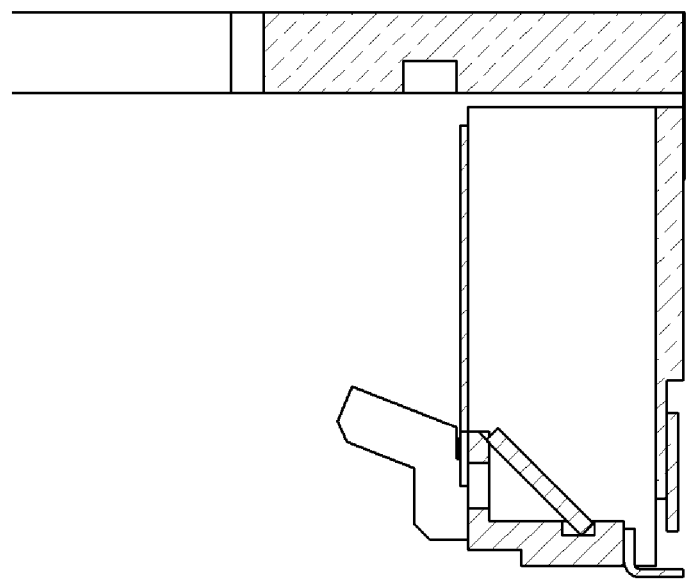

Fig. 1.2
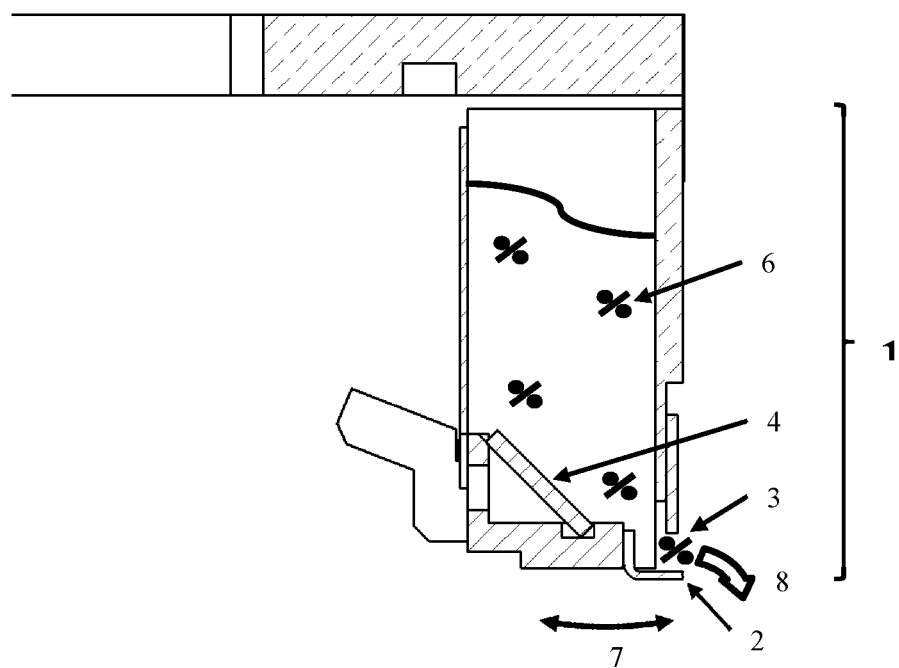

Fig. 1.3
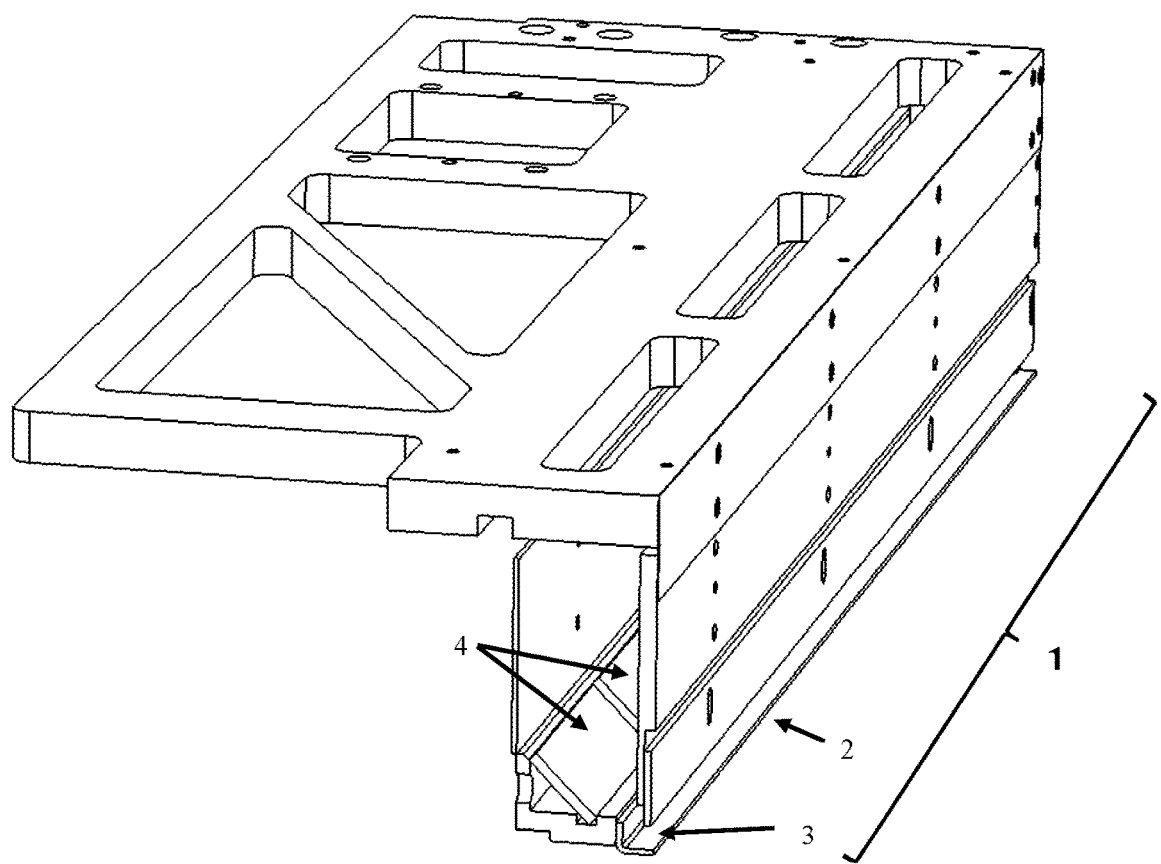

Fig. 2.1
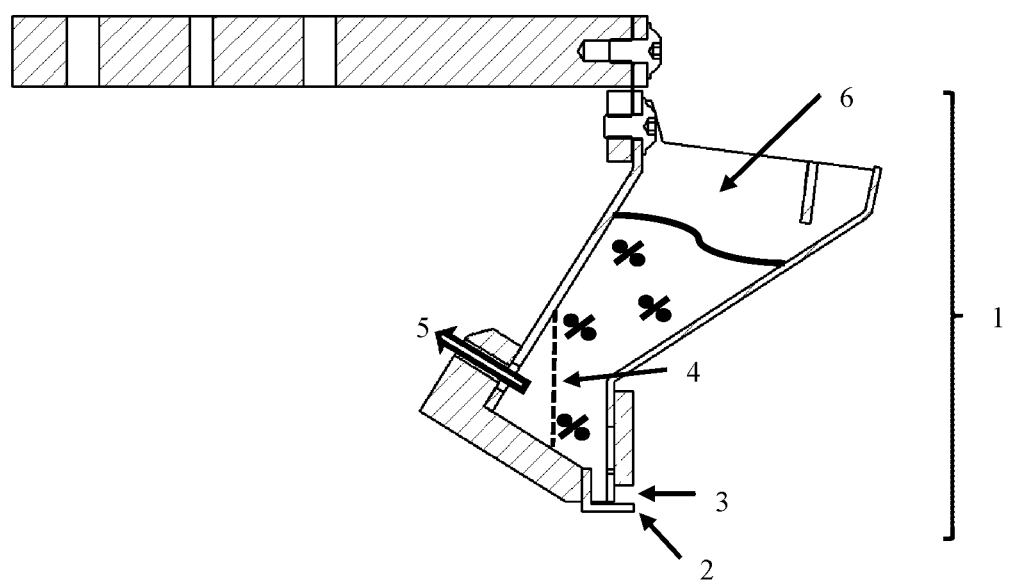

Fig. 3.1.
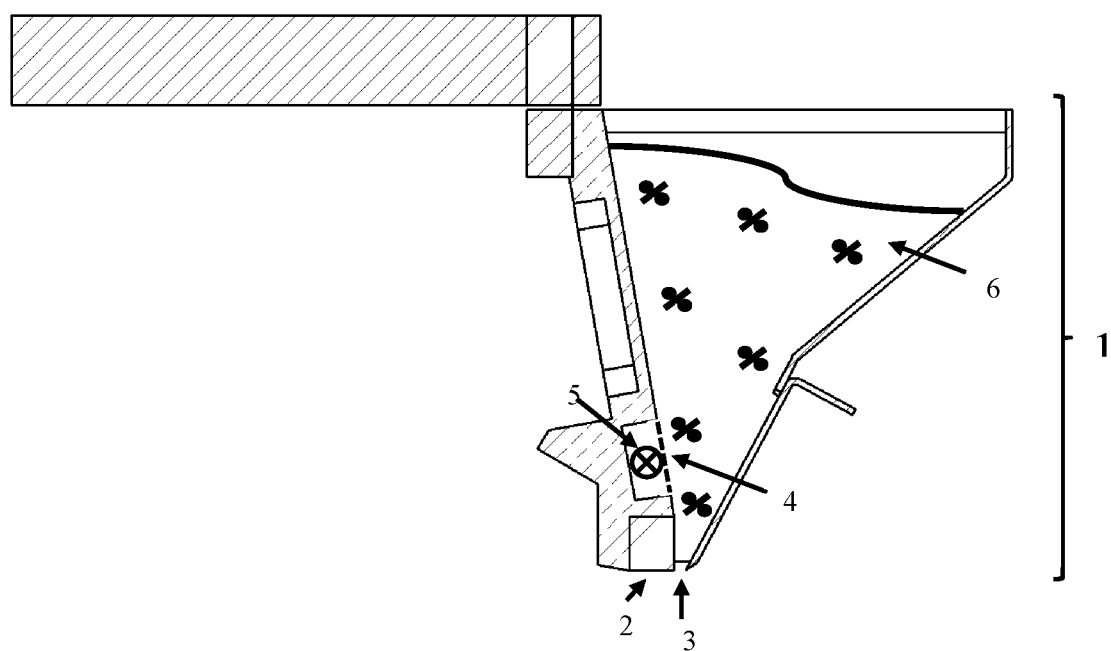

Fig. 3.2
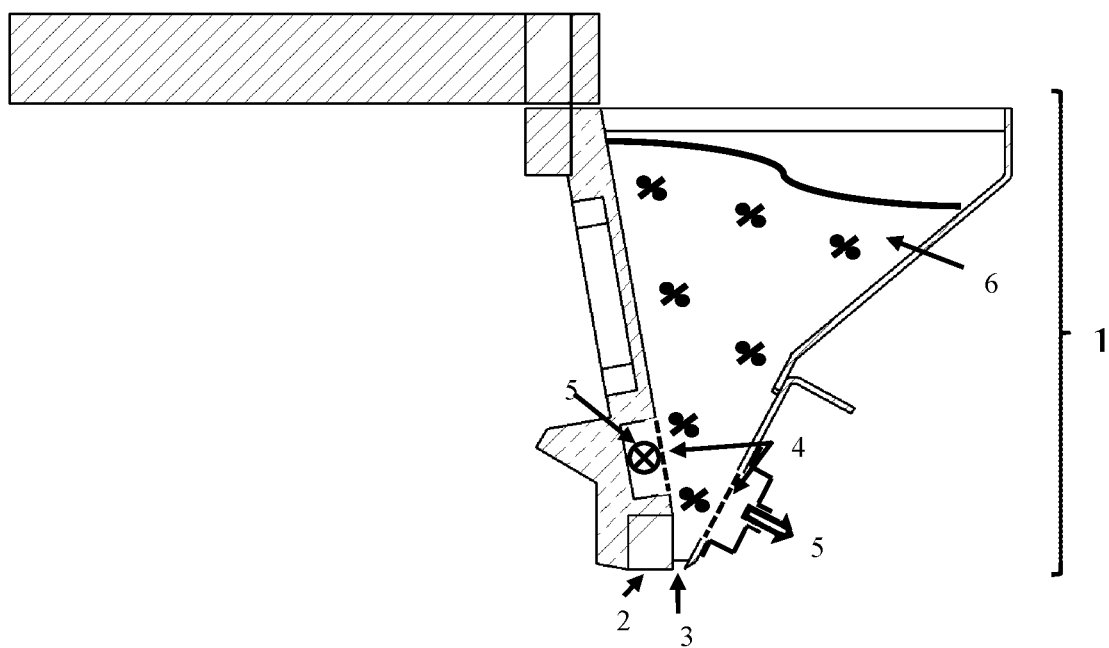

Fig. 4.1
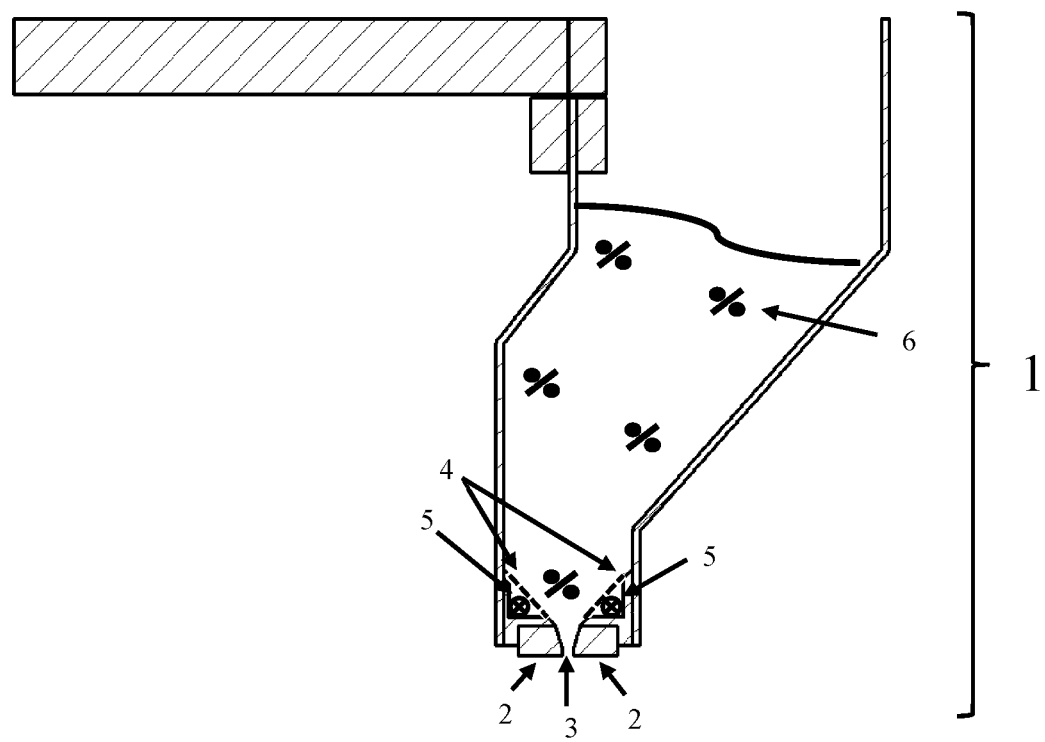

Fig. 5.1
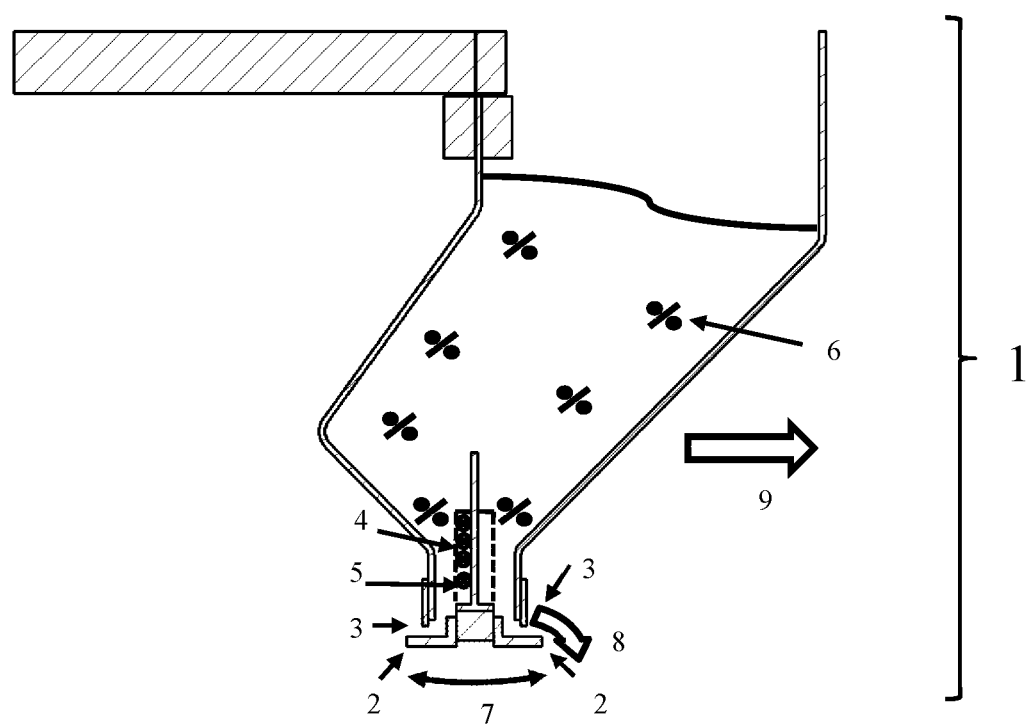

Fig. 5.2
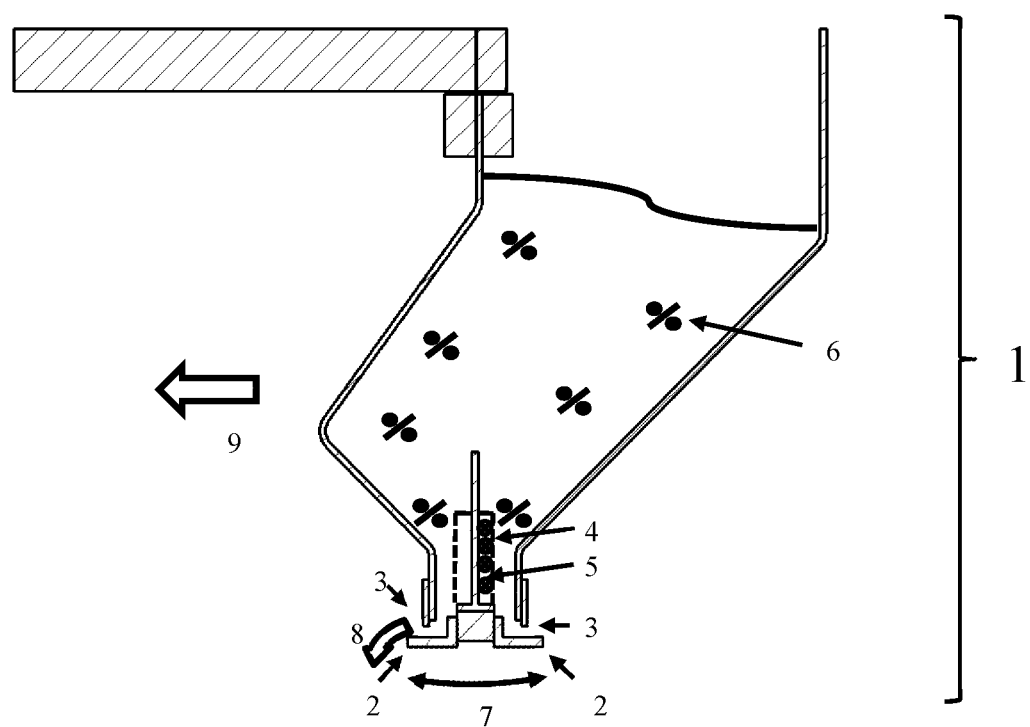

METHOD AND APPARATUS FOR PRODUCING 3D MOLDINGS BY MEANS OF A LAYERING TECHNIQUE, AND RECOATER WITH VACUUM CLOSURE

CLAIM OF PRIORITY

This application is a national phase filing under 35 USC § 371 from PCT Patent Application serial number PCT/DE20201000128 filed on Jun. 11, 2020 and claim priority therefrom. This application further claims priority to German Patent Application Number DE 102019004176.3 filed on Jun. 14, 2019. PCT/DE2020/000128 and DE 102019004176.3 are each incorporated herein by reference in its entirety.

FIELD

The invention relates to a method and an apparatus for producing three-dimensional models by means of a layering technique and to a recoater with a vacuum closure.

BACKGROUND

European Patent EP 0 431 924 B1 describes a process for producing three-dimensional objects based on computer data. In the process, a thin layer of particulate material is deposited on a construction platform by means of a recoater and the particulate material (generally a fluid) has a binder material selectively printed thereon by means of a print head. The particulate region with the binder printed thereon bonds and solidifies under the influence of the binder and, optionally, an additional hardener. Next, the construction platform is lowered by one layer thickness in a construction cylinder and provided with a new layer of particulate material, the latter also being printed on as described above. These steps are repeated until a certain desired height of the object is achieved. Thus, the printed and solidified regions form a three-dimensional object (molding).

Upon completion, the object made of solidified particulate material is embedded in loose particulate material, from which it is subsequently freed. For this purpose, a suction device may be used, for example. This leaves the desired objects which then have to be freed from any residual powder, e.g. by brushing it off.

In 3D printing apparatuss used in 3D printing methods, the particulate material feed onto the construction platform is performed with a recoater, which may have a controllable opening. The recoater opening may have one or more oscillating blades adjacent thereto, and the 3D printing apparatus may be equipped with a mechanism for generating oscillations, said oscillations enabling controlled discharge of fluid. The opening of the recoater is closed by a material cone forming in the fluid, which prevents fluid from escaping when no oscillations are generated. Oscillations which break the material cones up and allow the discharge of fluid are generated by the oscillation generating mechanism. The fluid discharge can be controlled by switching the oscillations on and off.

Now, the problem may arise that oscillations occur in a 3D apparatus or in a 3D method that are not generated by the mechanism for generating oscillations at the recoater, but are caused by other sources of oscillation. This may be the case, for example, in more complex machine setups. If such oscillations exceed a certain threshold and affect bridging in the fluid, it is possible that the bridging in the fluid is broken up and thus the fluid is discharged from the recoater in an undirected manner. In this case, an undefined oscillation interferes with a defined control of the fluid discharge and thus with the control of the fluid discharge, which thus becomes at least partially misdirected and imprecise. This may make controlled fluid discharge essentially impossible. Unwanted and undefined oscillations (undefined oscillations or spurious oscillations) occur more often the larger and more complex a 3D printing system is or when a 3D printing machine is integrated into a larger machine setup.

It was therefore an object of the present invention to provide constructional means allowing an improved 3D printing method or at least helping to improve the disadvantages of the prior art or altogether avoiding the disadvantages of the prior art.

A further object of the present invention was to provide a method and an apparatus whose fluid discharge from the recoater operates in a substantially controlled manner, even in the presence of spurious oscillations, and by which a controlled fluid discharge is substantially ensured.

BRIEF SUMMARY OF THE INVENTION

In one aspect, the invention relates to an apparatus for producing 3D moldings, which, in addition to the customary components for operating a 3D apparatus, comprises a recoater, wherein the recoater is connected to a means for generating vacuum in the fluid, e.g. particulate material—and which acts on the fluid inside the recoater—and the vacuum is switched in a coordinated manner with the controllable mechanism for generating defined oscillations.

In a further aspect, the invention relates to a method for producing 3D moldings, comprising the steps of switching on/applying a vacuum at a recoater (with reservoir) containing fluid, which acts on the fluid inside the recoater and wherein a vacuum is generated in the fluid, generating defined oscillations at the recoater or a coating blade of the recoater and switching off the vacuum at the recoater, and discharging the fluid from the outlet opening of the recoater, which process can be repeated as desired.

In a further aspect, the invention relates to a method for producing 3D moldings and in particular to controlling the discharge of fluids from a recoater of a 3D printing apparatus, wherein, in order to close the recoater, a vacuum is applied to the recoater which acts on the fluid inside the recoater and wherein a vacuum is created in the fluid, a means for generating defined oscillations is switched off (so that fluid no longer emerges from the outlet opening), and for discharging fluids, defined oscillations of a coating blade are generated by a means for generating defined oscillations, and the vacuum at the recoater is switched off, whereby the fluid is released from the outlet opening of the recoater, which process can be repeated as desired.

In another aspect, the invention relates to a 3D molding produced according to the method described above and/or according to the apparatus described above.

In a further aspect, the invention relates to an apparatus which is suitable for carrying out a method according to the disclosure.

BRIEF DESCRIPTION OF THE DRAWINGS

FIGS. 1.1-1.3 show an embodiment of the invention with a horizontal outlet opening. FIGS. 1.1 and 1.2 represent the two switching states of the system. If a vacuum is applied to the side of the porous medium facing away from the reservoir and, at the same time, no oscillation of the reservoir is generated, the particulate material is retained in the reservoir. (FIG. 1.1). When the vacuum is removed from the porous medium and an oscillation is introduced at the same time, the particulate material flows out of the reservoir (FIG. 1.2). However, the oscillation is not necessarily relevant for the discharge. This depends on the flowability of the particulate material. For example, the discharge of the particulate material can also be started and stopped by the vacuum only, regardless of whether or not an oscillation is present. In any case, the vacuum can prevent the discharge if spurious oscillations reach the recoater unit. FIG. 1.3 shows the elongated configuration of the recoater unit.

FIG. 2.1 shows a similar embodiment of the invention. The shape of the reservoir is different and the swing joint is attached to the rear wall of the reservoir, not to the front wall of the reservoir as in FIGS. 1.1-1.3. This is to show that the configuration of the reservoir is in principle not relevant to the invention. Thus, all the configurations shown in the schematic drawings are not restrictive. In both embodiments (1.1-2.1), the vacuum is applied through the rear wall of the reservoir.

FIG. 3.1 illustrates an embodiment that has a vertical outlet opening. The shape of the coating blade also differs from that of FIGS. 1.1-2.1. Thus, neither feature restricts the invention. An angled outlet opening and other blade shapes are also conceivable. In the embodiment shown, the vacuum is applied through one or both end faces of the reservoir, which again is not a restriction. FIG. 3.2 shows the same system with an additional porous medium and another possibility to apply a vacuum. The porous medium and the vacuum therefore do not necessarily have to be introduced through the rear wall of the reservoir.

FIG. 4.1 shows an embodiment of the invention in combination with a "double-acting recoater" embodiment of the invention. Thus, the invention does not necessarily require only one coating blade to be installed.

FIGS. 5.1 and 5.2 also show an embodiment of the invention in combination with a "double acting recoater" embodiment of the invention. This embodiment has 2 outlet openings. In order to be able to switch the particulate material flow through each outlet opening, at least one porous medium must be present for each outlet opening. In addition, it must be possible to switch the vacuum for the porous medium (media) associated with one outlet opening independently of the vacuum for the porous medium (media) associated with the other outlet opening.

DETAILED DESCRIPTION

According to the invention, an object underlying the application is achieved by an apparatus according to claim 1 or/and by a method according to claim 2 or/and 3. Further preferred aspects are described in the subclaims.

First of all, several terms of the disclosure will be explained in more detail below.

A "3D molding", "molded article" or "part" in the sense of the disclosure means any three-dimensional object manufactured by means of the method according to the invention or/and the apparatus according to the invention and exhibiting dimensional stability.

"Construction space" is the geometric location where the particulate material bed grows during the construction process by repeated coating with particulate material or through which the bed passes when applying continuous principles. The construction space is generally bounded by a bottom, i.e. the construction platform, by walls and an open top surface, i.e. the construction plane. In continuous principles, there usually is a conveyor belt and limiting side walls. The construction space can also be designed in the form of what is called a job box, which constitutes a unit that can be moved in and out of the apparatus and allows batch production, with one job box being moved out after completion of a process to allow a new job box to be moved into the apparatus immediately, thereby increasing both the production volume and, consequently, the performance of the apparatus.

The "particulate materials" or "particulate construction materials" or "construction materials" or "fluid" of use herein may be any materials known for powder-based 3D printing, in particular polymers, ceramics and metals. The particulate material is preferably a free-flowing powder when dry, but may also be a cohesive, cut-resistant powder or a particle-charged liquid. In this specification, particulate material and powder are used synonymously.

The "particulate material application" is the process of generating a defined layer of powder. This may be done either on the construction platform or on an inclined plane relative to a conveyor belt in continuous principles. The particulate material application will also be referred to below as "recoating".

"Selective liquid application" in the sense of the disclosure may be effected after each particulate material application or irregularly, depending on the requirements for the molded article and for optimization of the molded article production, e.g. several times with respect to particulate material application. In this case, a sectional image of the desired article is printed.

The "apparatus" used for carrying out a method according to the disclosure may be any known 3D-printing apparatus which includes the required parts. Common components include recoater, construction field, means for moving the construction field or other parts in continuous processes, metering devices and heating and irradiating means and other parts which are known to the person skilled in the art and will therefore not be described in detail herein.

The construction material according to the disclosure is always applied in a "defined layer" or "layer thickness", which is individually adjusted according to the construction material and the process conditions. It is, for example, 0.05 to 0.5 mm, preferably 0.1 to 0.3 mm.

A "recoater" within the meaning of the disclosure is a device part that can receive fluid, e.g., particulate material such as mineral, metallic or plastic materials, wood in the form of particles, or mixtures thereof, and dispense or apply it layerwise in a controlled manner onto a construction platform of a 3D apparatus. The recoater can be elongated and the particulate material is located in a reservoir above an outlet opening.

A "reservoir" in the sense of the disclosure is to be understood as the part of a recoater into which the particulate material is filled in and and from which it is dispensed and applied onto the construction platform of the 3D apparatus in a controlled manner via an outlet opening.

A "coating blade" as defined in the disclosure is a substantially flat part made of metal or other suitable material, which is located at the outlet of the recoater and through which the fluid is discharged onto the construction platform and is smoothed down. A recoater may have one or two or more coating blades. A coating blade can be an oscillating blade that performs oscillations in the sense of a rotary motion when excited. Further, this oscillation can be switched on and off by a means for generating oscillations.

Depending on the arrangement of the outlet opening, the coating blade is arranged "substantially horizontally" or "substantially vertically" within the meaning of the disclosure.

An "outlet opening" as defined in the disclosure is located, for example, on the underside or side of the recoater and is in communication with a coating blade. The outlet opening runs along the length of the recoater and extends across the entire width of the construction platform. If several coating blades are used, one outlet opening is arranged on each coating blade.

In the sense of the disclosure, the outlet opening is arranged on the recoater, in correspondence with the coating blade, "essentially horizontally", i.e. laterally on the recoater, or "essentially vertically", i.e. at the bottom of the recoater.

A "means for generating a vacuum" as defined in the disclosure may be a pump or any means for generating a vacuum. Said means is located outside the recoater and communicates with the recoater, i.e. with the interior, e.g. the reservoir, via special means for retaining the particulate material. A vacuum can thus be created in the particulate material present in the recoater, thereby assisting or enabling a controlled discharge and the stopping of the discharge of the particulate material despite spurious oscillations. It may also be advantageous if the means for generating a vacuum can also be switched. This allows, for example, short overpressure surges to be injected into the screens, the semipermeable membranes, the suction plates (vacuum pad) or the porous media in order to clean them by means of reverse flow. To prevent the fluid from being blown out of the recoater, further means can be arranged inside the recoater to counteract this.

A "controllable mechanism for producing defined oscillations" or a "means for producing defined oscillations" as defined in the disclosure may be an eccentric or a magnetic coil or any means capable of producing defined oscillations or capable of producing oscillations on a certain part in an apparatus. In the sense of the disclosure, an oscillation is generated at the coating blade or blades. The oscillations thus generated at the coating blade are so great or so strong that they create material cones in the particulate material that close the outlet opening of the recoater when the means for generating oscillations is switched off.

"Switched in a coordinated manner" as used in the disclosure means that two or more functions in an apparatus or method are switched in a particular way, e.g., that at least two functions are switched so that a particular effect can be produced. For example, the vacuum can be switched on and regulated and the oscillation at the coating blade can be switched off and vice versa. One such effect may be that. This can be used to achieve a specific effect, such as closing or opening an outlet opening in a recoater.

"Switching on" or "applying a vacuum to a recoater" in the sense of the disclosure is understood to mean that a means for generating a vacuum is switched on and, in the fluid present in a recoater, a vacuum is generated in the particulate material or at least a vacuum is generated in the fluid present in the region of the outlet opening. The vacuum is generated by a circuit of suitable means, such as flexible tubes, connected to the recoater. In this case, means are used to ensure that the fluid remains substantially within the recoater, said means being arranged between the fluid and the means for generating a vacuum. Thus, the vacuum acts on the fluid inside the recoater and a vacuum is created in the fluid. The vacuum can be switched on and off and it can be switched in a manner coordinated with other functions of the apparatus and during the printing process. The vacuum generated in the fluid in the recoater helps to prevent the fluid from escaping from the recoater despite spurious oscillations when the defined oscillations in the apparatus or during the process are switched off.

"Closing the recoater" as defined in the disclosure means that the outlet opening is closed with fluid and substantially no fluid is discharged onto the construction platform. Such closure is due to bridging in the fluid. When spurious oscillations occur, the application of a vacuum to the recoater or the creation of a vacuum in the fluid supports the formation or/and maintenance of bridges and thus ensures that the outlet opening remains closed despite spurious oscillations and that essentially no fluid is discharged onto the construction platform.

"Opening of the recoater" in the sense of the disclosure is effected on the one hand by switching on a defined oscillation at the coating blade, whereby the bridging in the fluid is broken up and the fluid is discharged from the outlet opening onto the construction platform.

On the other hand, and when a vacuum is applied to the recoater, the recoater is essentially switched off at the same time that the defined oscillations are generated. This then results in the "discharge of fluids" in the sense of the disclosure. Thus, "fluid is discharged from the outlet opening of the recoater" in the sense of the disclosure.

As used in the disclosure, "undefined oscillations" or "spurious oscillations" means any oscillations on a 3D apparatus or/and on the recoater or/and at the coating blade which do not serve the purpose of a controlled discharge of fluid from the recoater or the controlled opening of the outlet opening of the recoater.

Further aspects of the invention will be described in more detail below.

In one aspect, the disclosure relates to an apparatus for applying fluids suitable for 3D printing apparatuses, comprising a coating blade, an outlet opening for discharging fluid, a controllable mechanism for generating defined oscillations of the coating blade, a recoater with a reservoir for receiving fluid, e.g. particulate material, said apparatus being characterized in that the recoater is connected to a means for generating a vacuum in the fluid, e.g. particulate material, and the vacuum is switched in coordination with the controllable mechanism for generating defined oscillations.

In one aspect, the disclosure relates to a method for discharging fluids, e.g. particulate material, said method comprising the steps of switching on/applying a vacuum at a recoater containing fluid, which vacuum acts on the fluid inside the recoater and wherein a vacuum is created in the fluid, generating defined oscillations at a coating blade of the recoater and switching off the vacuum at the recoater, and discharging the fluid from the outlet opening of the recoater.

In one aspect, the disclosure relates to a method for controlling the discharge of fluids (e.g. particulate material) from a recoater of a 3D printing apparatus, wherein, in order to close the recoater, a vacuum is applied to the recoater which acts on the fluid inside the recoater and wherein a vacuum is created in the fluid, a means for generating defined oscillations is switched off (so that fluid no longer emerges from the outlet opening), and, for discharging fluids, defined oscillations of a coating blade are generated by a means for generating defined oscillations, and the vacuum at the recoater is switched off, whereby the fluid is released from the outlet opening of the recoater.

The method of the invention and the apparatus according to the disclosure provide a particularly advantageous solution that reduces or substantially prevents uncontrolled discharge of fluid from a recoater of a 3D printing apparatus due to spurious oscillations. Thus, the apparatus and method according to the disclosure provide an advantageous solution to the problem underlying the application.

With the method according to the invention, the above-described problems or disadvantages are at least reduced or avoided completely.

In further and preferred aspects, the disclosure relates to the following:

The disclosure relates to apparatuses as well as methods suitable for 3D printing, wherein, in a defined and controlled manner, fluid from a recoater can be discharged or the discharge can be interrupted, although in the system, printing system or the assembly of different components of a 3D printing apparatus or of several 3D printing apparatuses spurious oscillations do not the selective discharge or the interruption of the discharge of fluid.

In particular, the disclosure relates to an apparatus for applying fluids suitable for 3D printing apparatuses, said apparatus comprising a coating blade, an outlet opening for discharging fluid, a controllable mechanism for generating defined oscillations of the coating blade, a recoater with a reservoir for receiving fluid, e.g. particulate material, said apparatus being characterized in that the recoater is connected to a means for generating a vacuum in the fluid, e.g. particulate material, ((which vacuum acts on the fluid inside the recoater,)) and the vacuum is switched in coordination with the controllable mechanism for generating defined oscillations.

In particular, the disclosure also relates to a method for discharging fluids, e.g. particulate material, comprising the steps of switching on/applying a vacuum to a recoater having a container containing fluid or/and having a reservoir containing fluid, said vacuum acting on the fluid inside the recoater, and wherein a vacuum is created in the fluid, said vacuum helping to prevent the fluid from escaping from the outlet opening of the recoater due to undefined oscillations, generating defined oscillations at a coating blade of the recoater and switching off the vacuum at the recoater, and discharging the fluid from the outlet opening of the recoater.

In particular, the disclosure also relates to a method for controlling the discharge of fluids (e.g. particulate material, a free-flowing material) from a recoater of a 3D printing apparatus, wherein, in order to close the recoater, a vacuum is applied to the recoater which acts on the fluid inside the recoater and wherein a vacuum is created in the fluid, a means for generating defined oscillations is switched off—so that fluid substantially no longer emerges from the outlet opening—and for discharging fluids, defined oscillations of a coating blade are generated with a means for generating defined oscillations, and the vacuum at the recoater is switched off, whereby the fluid is released from the outlet opening of the recoater.

In the apparatus and methods as described herein, any free-flowing materials suitable and known for 3D printing may be used that are compatible with the further apparatus means as well as the further method parameters. A suitable fluid can be a particulate material and it can be a mineral, metallic or plastic material, wood, or mixtures thereof.

Known coating blades can be used in the apparatus and method, which are adapted to the other means and apparatus and process components and parameters. The coating blade can be designed, for example, as one or two coating blades, which can be arranged, for example, substantially horizontally or substantially vertically.

In this case, the outlet opening at the coating blade is selected and adapted in coordination with the other apparatus and method conditions, and the outlet opening may be arranged substantially horizontally or substantially vertically.

For the generation of a defined oscillation, any means known to the skilled person can be used, which are well known to the skilled person and therefore need not be further described here. The defined oscillations can be generated, for example, by an eccentric or a magnetic coil.

To generate a vacuum or reverse vacuum (i.e., an overpressure for cleaning), any means known to the skilled person can be used, which are well known to the skilled person and therefore need not be further described here. For example, the means for generating a vacuum may be a vacuum pump.

It is advantageous to provide a means that prevents the fluid from being sucked out of the recoater or reservoir when the vacuum is applied. Thus, in a method or apparatus according to the disclosure, it may be provided that one or more screens, one or more semi-permeable membranes, one or more suction plates (vacuum pad) or one or more porous media are arranged between the recoater and the means for generating a vacuum, the average diameter of the passage openings of which is smaller than the particulate material, preferably wherein the average diameter of the passage openings is less than 2 millimeters or less than 1 millimeter or less than 0.1 to 0.05 millimeters.

Such a means is arranged in a suitable position. For instance, the screen, the semi-permeable membrane, the suction plate or/and the porous medium can be mounted laterally in the reservoir of the recoater or/and laterally above the oscillating blade.

Furthermore, it can be advantageous if a certain level of fluid is set in the apparatus and thus maintained during the process. It may be advantageous if the screen, semi-permeable membrane, suction plate, or/and porous medium is substantially covered with particulate material during operation.

The vacuum is set in accordance with the other process conditions and it can also vary during the process, e.g. the vacuum can be 50-999 or 100-400 mbar, preferably 200-250 mbar.

It may be advantageous to clean the means such as the screen, the semi-permeable membrane, the suction plate or/and the porous medium. For this purpose, it may be advantageous if the direction of the vacuum can be reversed or the vacuum can be switched to overpressure in order to clean the screen, the semi-permeable membrane, the suction plate or/and the porous medium.

In conjunction with the screen, semi-permeable membrane, suction plate, or/and porous medium, a slider or tilting louver may be provided internally in the recoater to prevent or reduce the blowing of air into the fluid. Said means, such as a slider or tilting louver, can be arranged parallel to the screen, the semi-permeable membrane, the suction plate or/and the porous medium, respectively.

LIST OF REFERENCE NUMERALS 1 reservoir
2 coating blade
3 outlet opening
4 screen or semi-permeable membrane or suction plate or porous medium
5 vacuum
6 fluid (particulate material)

7 oscillation
8 fluid flow (particulate material flow)
9 movement direction of the recoater unit

What is claimed is:

1. An apparatus for applying fluids suitable for 3D printing apparatuses, said apparatus comprising a coating blade, an outlet opening for discharging fluid, a controllable mechanism for generating defined oscillations of the coating blade, a recoater with a reservoir for receiving fluid, characterized in that the recoater is connected to a means for generating a vacuum in the fluid, and the vacuum is operated in coordination with the controllable mechanism for generating defined oscillations, optionally wherein the fluid is a particulate material.

2. A method for discharging fluids, said method comprising the steps of:
applying a vacuum at a recoater containing fluid, which vacuum acts on the fluid inside the recoater and wherein a vacuum is created in the fluid; and
generating defined oscillations at a coating blade of the recoater and switching off the vacuum at the recoater, and discharging the fluid from the outlet opening of the recoater, optionally wherein the fluid is a particulate material.

3. A method for controlling the discharge of fluids from a recoater of a 3D printing apparatus, wherein, in order to close the recoater, a vacuum is applied to the recoater which acts on the fluid inside the recoater and wherein a vacuum is created in the fluid, a means for generating defined oscillations is switched off so that fluid no longer emerges from the outlet opening, and, for discharging fluids, defined oscillations of a recoating blade are generated by the means for generating defined oscillations, and the vacuum at the recoater is switched off, whereby the fluid is released from the outlet opening of the recoater, optionally wherein the fluid is a particulate material.

4. The apparatus of claim 1, wherein the fluid is a particulate comprising a mineral, a metallic material, a plastic material, a wood, or a mixture thereof.

5. The apparatus according to claim 4, wherein the coating blade is arranged substantially horizontally or substantially vertically, or/and
wherein the outlet opening is arranged substantially horizontally or substantially vertically, or/and
wherein the defined oscillations are generated by an eccentric or a magnetic coil, or/and
wherein the means for generating a vacuum is a vacuum pump;
optionally wherein the device includes two coating blades.

6. The apparatus of claim 4, wherein one or more screens, one or more semi-permeable membranes, one or more suction plates, one or more vacuum pads, or one or more porous media are arranged between a reservoir of the recoater and the means for generating a vacuum, an average diameter of the passage openings of which is smaller than the particulate material, optionally wherein the average diameter of the passage openings is less than 2 millimeters.

7. The apparatus according to claim 6, wherein the one or more screens, one or more semi-permeable membranes, one or more suction plates, one or more vacuum pads, or one or more porous media is/are arranged laterally in the reservoir of the recoater or/and laterally above the oscillating blade.

8. The apparatus according to claim 1,
wherein the screen, semi-permeable membrane, suction plate, or/and porous medium is substantially covered with particulate material during operation and/or
wherein the vacuum is 50-999 mbar.

9. The apparatus of claim 1, wherein the direction of the vacuum can be reversed or the vacuum can be switched to overpressure in order to clean the screen, the semi-permeable membrane, the suction plate or/and the porous medium, or/and wherein a slider or tilting louver is arranged parallel to the screen, the semi-permeable membrane, the suction plate or/and the porous medium, respectively, inside the recoater.

10. The method of claim 2, wherein the fluid is a particulate material.

11. The method of claim 10,
wherein the coating blade is arranged substantially horizontally or substantially vertically, or/and
wherein the outlet opening is arranged substantially horizontally or substantially vertically, or/and
wherein the defined oscillations are generated by an eccentric or a magnetic coil, or/and
wherein the means for generating a vacuum is a vacuum pump;
optionally wherein the method employs two of the coating blades.

12. The method of claim 10, wherein one or more screens, one or more semi-permeable membranes, one or more suction plates, one or more vacuum pads, or one or more porous media are arranged between a reservoir of the recoater and the means for generating a vacuum, an average diameter of the passage openings of which is smaller than the particulate material, optionally wherein the average diameter of the passage openings is less than 2 millimeters.

13. The method of claim 12 wherein the one or more screens, one or more semi-permeable membranes, one or more suction plates, one or more vacuum pads, or one or more porous media is/are arranged laterally in the reservoir of the recoater or/and laterally above the oscillating blade.

14. The method of claim 12, wherein the screen, semi-permeable membrane, suction plate, or/and porous medium is substantially covered with particulate material during operation and the vacuum is 50-999 mbar.

15. The method of claim 12, wherein the direction of the vacuum can be reversed or the vacuum can be switched to overpressure in order to clean the screen, the semi-permeable membrane, the suction plate or/and the porous medium, or/and wherein a slider or tilting louver is arranged parallel to the screen, the semi-permeable membrane, the suction plate or/and the porous medium, respectively, inside the recoater.

16. The method of claim 3,
wherein the fluid is a particulate material; and
wherein the coating blade is arranged substantially horizontally or substantially vertically, or/and
wherein the outlet opening is arranged substantially horizontally or substantially vertically, or/and
wherein the defined oscillations are generated by an eccentric or a magnetic coil, or/and
wherein the means for generating a vacuum is a vacuum pump;
optionally wherein the method employs two coating blades.

17. The method of claim 3,
wherein the fluid is a particulate material;
wherein one or more screens, one or more semi-permeable membranes, one or more suction plates, one or more vacuum pads, or one or more porous media are arranged between a reservoir of the recoater and the means for generating a vacuum, an average diameter of the passage openings of which is smaller than the particulate material, optionally wherein the average diameter of the passage openings is less than 2 millimeters;

optionally wherein the one or more screens, one or more semi-permeable membranes, one or more suction plates, one or more vacuum pads, or one or more porous media is/are arranged laterally in the reservoir of the recoater or/and laterally above the oscillating blade;

optionally wherein the screen, semi-permeable membrane, suction plate, or/and porous medium is substantially covered with particulate material during operation;

optionally wherein the vacuum is 50-999 mbar;

optionally wherein the direction of the vacuum can be reversed or the vacuum can be switched to overpressure in order to clean the screen, the semi-permeable membrane, the suction plate or/and the porous medium;

optionally wherein a slider or tilting louver is arranged parallel to the screen, the semi-permeable membrane, the suction plate or/and the porous medium, respectively, inside the recoater.

18. The method of claim 10, wherein the release of fluid from the outlet opening of the recoater applies the particulate material to a top surface of a construction space in a defined layer of 0.05 to 0.5 mm.

19. The method of claim 18, wherein the method includes filling a reservoir of the recoater with an additional amount of the particulate material.

20. The method of claim 19, wherein the method includes selectively applying a liquid to the particulate material at the top of the construction space for printing a sectional image of a part.

21. An apparatus for applying fluids suitable for 3D printing comprising:
a coating blade;
a controllable mechanism for generating defined oscillations of the coating blade,
a recoater with an outlet opening for discharging fluid and a reservoir for receiving fluid; and
a means for generating a vacuum in the fluid;
characterized in that the recoater is connected to the means for generating a vacuum in the fluid, and the vacuum is operated in coordination with a position of the coating blade, optionally wherein the fluid is a particulate material.

22. An apparatus for applying fluids suitable for 3D printing comprising:
a coating blade;
a controllable mechanism for generating defined oscillations of the coating blade,
a reservoir for receiving a fluid;
two outlet openings for discharging the fluid including a first outlet opening in a first direction and a second outlet opening in an opposing direction; and
a means for generating a vacuum in the fluid;
wherein the means for generating a vacuum operates on the fluid via porous media to independently closes the first and second outlet openings by forming or maintaining a bridge in the fluid, and the vacuum is operated in coordination with a position of the coating blade, optionally wherein the fluid is a particulate material.

* * * * *